F. K. CASWELL.
PROCESS FOR MAKING BRAKE SHOES.
APPLICATION FILED DEC. 17, 1906.

973,168.

Patented Oct. 18, 1910.

Witnesses:
L. V. Domarus.
N. Sprinkle.

Inventor:
F. K. Caswell
by Brown Darby & Hoffman
Attys

F. K. CASWELL.
PROCESS FOR MAKING BRAKE SHOES.
APPLICATION FILED DEC. 17, 1906.

973,168.

Patented Oct. 18, 1910.

F. K. CASWELL.
PROCESS FOR MAKING BRAKE SHOES.
APPLICATION FILED DEC. 17, 1906.

973,168.

Patented Oct. 18, 1910.
9 SHEETS—SHEET 7.

Witnesses:
Inventor:
F. K. Caswell
by Brown Darby & Hopkins
attys

THE NORRIS PETERS CO., WASHINGTON, D. C.

F. K. CASWELL.
PROCESS FOR MAKING BRAKE SHOES.
APPLICATION FILED DEC. 17, 1906.

Patented Oct. 18, 1910.

F. K. CASWELL.
PROCESS FOR MAKING BRAKE SHOES.
APPLICATION FILED DEC. 17, 1906.

973,168.

Patented Oct. 18, 1910.
9 SHEETS—SHEET 9.

Witnesses:
L. V. Tomarus.
H. Hinkle.

Inventor:
F. K. Caswell,
by Brown, Darby & Hopkins
Attys

THE NORRIS PETERS CO., WASHINGTON, D. C.

UNITED STATES PATENT OFFICE.

FREDERICK K. CASWELL, OF LOS ANGELES, CALIFORNIA, ASSIGNOR TO PAUL DICKINSON (INCORPORATED), OF CHICAGO, ILLINOIS, A CORPORATION OF WYOMING.

PROCESS FOR MAKING BRAKE-SHOES.

973,168.   Specification of Letters Patent.   Patented Oct. 18, 1910.

Application filed December 17, 1906. Serial No. 348,173.

*To all whom it may concern:*

Be it known that I, FREDERICK K. CASWELL, a citizen of the United States, residing at Los Angeles, in the county of Los Angeles and State of California, have invented certain new and useful Improvements in Processes for Making Brake-Shoes, of which the following is a full, clear, and exact specification.

My invention relates to improvements in brake shoes for railway trains and the like and has for its primary object to provide an improved method of constructing brake shoes whereby I secure a more efficient and economical brake shoe than heretofore produced, and securing at the same time efficiency and economy in manufacture and attain a certain degree of uniformity of product which I find very desirable.

To the attainment of these ends and the accomplishment of other new and useful objects, as will appear, my invention consists in the features of novelty in processes hereinafter more fully described and claimed and illustrated in the accompanying drawings in which I illustrate one means which may be employed in carrying out the processes embraced in my invention, and in which:—

In the following description of the steps employed in producing my brake shoe I illustrate fully and make constant reference to the mechanism that I prefer to employ, although it is evident that this mechanism may be greatly varied in any or all of the steps performed by simpler and more crude means than I employ, and many of the steps may even be performed by ordinary hand labor.

I make no claim in this application to the specific mechanism employed as the same is the subject of other applications for Letters Patent filed by me of even date herewith.

Figure 1:
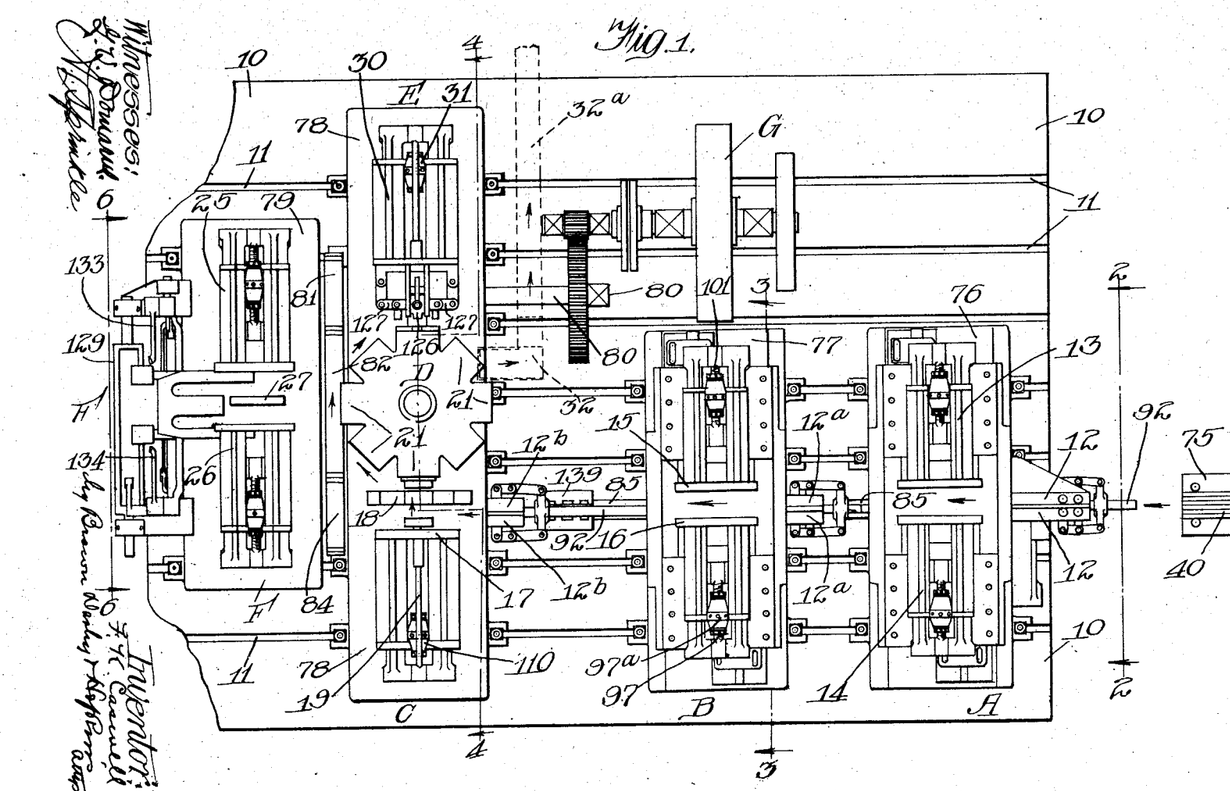
Figure 1 is a plan view of an assembled mechanism employed in producing a complete brake shoe by my process. For the purpose of greater clearness in referring to the other figures I divide the mechanism as illustrated in Fig. 1 into sections designated by the upper case letters A, B, C, D, E, F and G.
Figure 2:
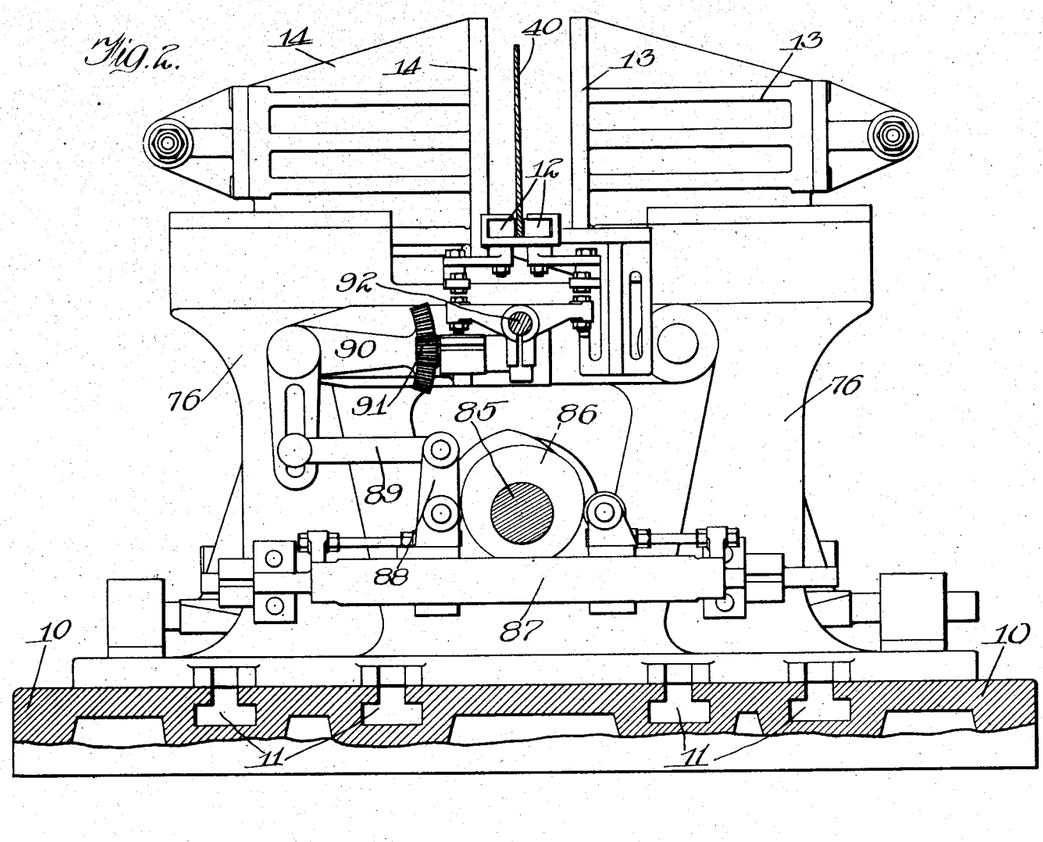
Fig. 2 is a side elevation of mechanism designated by section A in Fig. 1 and is taken on line 2—2 Fig. 1. In this figure a portion of the base plate on which the machine rests is broken away in order to show the manner of adjustably attaching the same thereto.

10 is a bed plate on which is adjustably mounted a series of mechanisms indicated by sections marked A, B, C, D, E, F and G respectively on Fig. 1. This plate is provided with a series of slots 11 adapted to take retaining bolts from various mechanisms mounted thereon. The group of mechanism represented by the letter G refers to means of producing power for driving the associate mechanisms. The mechanism embraced in section A, illustrated more fully in Fig. 2, is adapted to receive material for forming the holder or shell of my brake shoe in the form of elongated strips or blanks. These blanks are preferably of the required thickness for forming the shell and of a width to correspond approximately to the length required to make the completed shell. This material may be fed to the machine in strips of any desired length, although for convenience in handling, I prefer to have the material come from the mills in strips about 20 ft. in length. A portion of one of such strips is indicated by 40. Suitable feeding mechanism may be employed in connection with the mechanism in section A, as for example, the movable jaws 12, to grasp a bar or strip of this sheet metal and feed it longitudinally through the mechanism in the direction indicated by the arrow in section A. Suitable cutting or punching dies here act upon the metal producing a series of cuts or slits in distinct groups each group of such cuts or slits adapted to blank out the material to be embodied in a single shell or holder and consisting of the elongated side slits 41 and 42 which extend at approximately right angles to the length of the strip but are not cut entirely through the strip at the ends thereof. This manner of blanking out the holders preserves the entire strip of material intact so that it may be fed farther through the machine for succeeding operations.

By reference to Figs. 7 to 16 inclusive it will be seen that slits or cuts 41 and 42 determine the width of the completed blank for forming the shell. The irregular slits or cuts 43 to 54 inclusive extend longitudinally of the shell or blank midway between the slits 41 and 42 and are for the purpose of providing means for attaching the brake shoe at its back to the brake block or head. Cuts 43, 44, 45, 46, 47 and 48 surround members 43$^a$, 44$^a$, 45$^a$, 46$^a$, 47$^a$ and 48$^a$ respectively. These last members are all adapted to bend or form outwardly from the back of the blank for the purpose of forming members at each end of the shoe to take both endwise and lateral strains. Cuts 49 and 50 form members 49$^a$ and 50$^a$ which are likewise adapted to be bent outwardly to form metal supports in attaching the brake head. The rectangular holes 51 and 52 form members 49$^a$ and 50$^a$ for the purpose of taking ordinary retaining key or pin used on the common Christy or M. C. B. head. It will be seen that the various cuts performed on blank shown in Fig. 7 may be made at one operation of the punching die carried by the mechanism in section A. It will be noted that this mechanism performing the first operation on the blank is a double headed single acting press in which the movable heads 13 and 14 are adapted to carry the dies.

In Fig. 2 a section of bar 40 of sheet metal is shown in position in feeding mechanism. The die or dies for performing this operation and their coöperating members are not shown. It is evident that a single headed press may be used as well in performing this operation for the reason that it is a simple punching operation and as no bending out of the planes of the sides of the material takes place while the material is in this mechanism it may readily be disengaged by the feeding mechanism in order that it may be passed on to the next mechanism for further treatment. After the sheet of material receives the cuts illustrated in Fig. 7 it is next passed by feeding means to the mechanism illustrated in Fig. 1 section B as also shown in enlarged form in elevation in Fig. 3. This mechanism as shown is a duplicate of the double headed press described in previous operation and it is also provided with feeding mechanism containing jaws 12$^a$ as illustrated in Fig. 1. During the passing of the material through this mechanism it is acted upon in the manner indicated in Fig. 8. It will be noted that the process is entirely one of forming or bending of the members 43$^a$ to 50$^a$ inclusive at approximately right angles to the plane of the blank as indicated more clearly by reference to Fig. 9. All of the last mentioned members it will be noted, are bent outwardly from the blank on the same side thereof and on the side which afterward becomes the back side or the outside of the shell. It will also be noted that in this mechanism members 53$^a$, 53$^b$, 54$^a$ and 54$^b$ are formed outwardly from the plane of the blank but on the opposite side of the blank from members just mentioned and on the side that afterward becomes the inner side of the shell. It will be noted that this operation leaves the shell blank still intact with the material in sheet form and that to perform this operation of bending it is necessary that the double headed form of press be employed in order to free the sheet of material from contact with the dies as the surface of the material is no longer smooth as it was after the first operation. In the mechanism shown in section B, Figs. 1 and 3, numerals 15 and 16 indicate the movable members of the press which carry the forming dies corresponding to parts 13 and 14 in mechanism section A. From the mechanism just described, the blanks still intact in the original sheet are fed onwardly to the mechanism indicated by Figs. C, D, E and F. The sheets first enter mechanism indicated in Fig. 1, section C shown also in enlarged elevation in Fig. 4 where they are first seized by feeding mechanism similar to that already described and indicated by the grasping jaws 12<sup>b</sup>, section C, Fig. 1.

Figure 4:
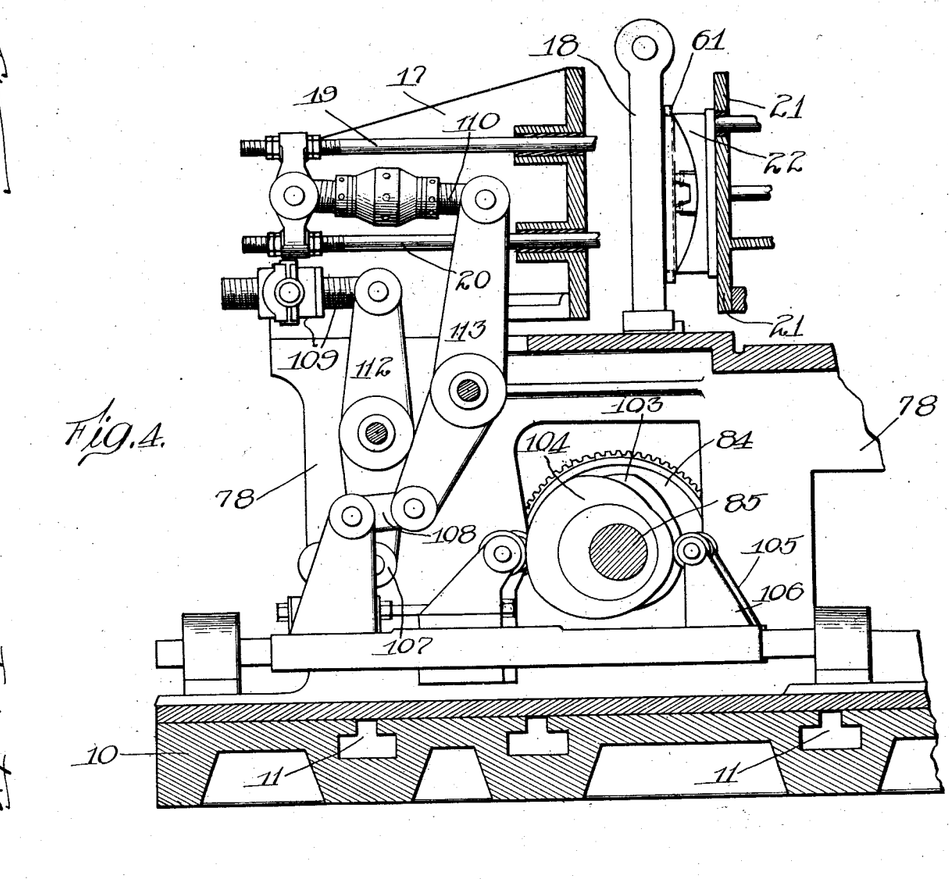
Figs. 4 and 5 taken together, illustrate a side elevation of mechanism indicated by sections C, D and E Fig. 1. These views are taken on line 4—4 of Fig. 1 and Fig. 4 has parts of sections C and D broken away to show the interior construction.
Figure 11:
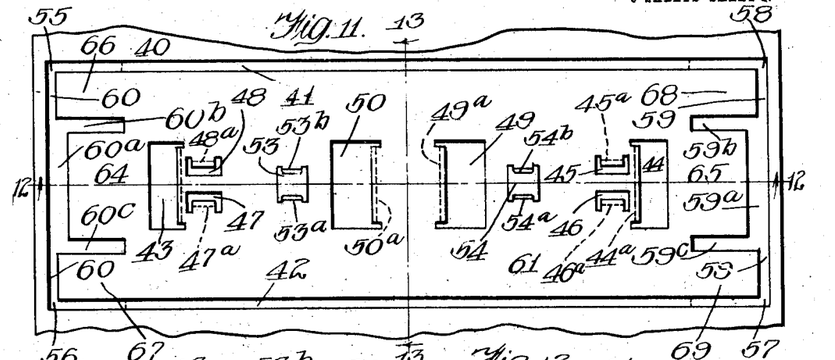
Fig. 11 illustrates the succeeding operation, that of entirely severing the holder or shell blank from the original sheet.
Figure 12:
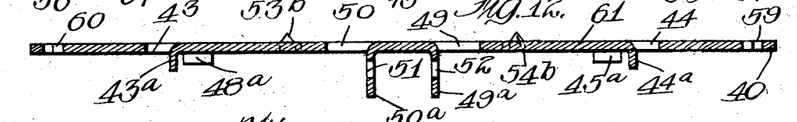
Figs. 12 and 13 are sectional views on line 12—12, and 13—13 respectively, Fig. 11.
Figures 13, 14:
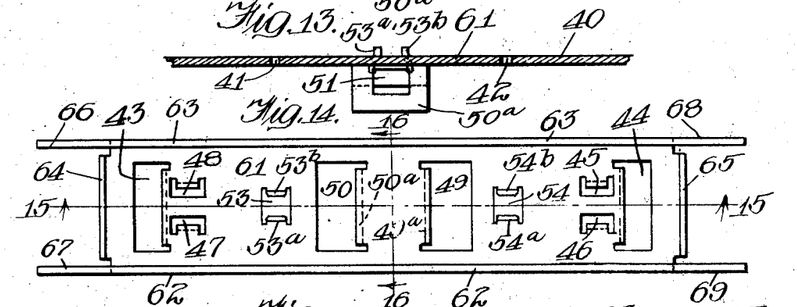
Fig. 14 illustrates the holder or shell after the operation of bending the side and end members in order to prepare the same for the reception of the filling material. In the present embodiment of the invention the operations required to produce the shell as it appears in Figs. 11 and 14 follows immediately the operation on the same in section B, both operations are produced by the double acting punching and forming mechanism in section C, Figs. 1 and 4.
Figure 15:
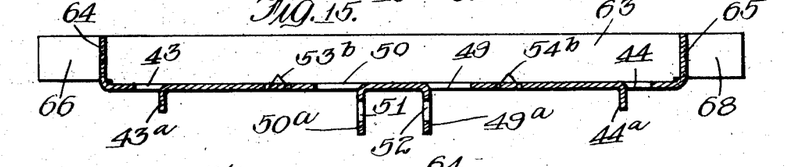
Figs. 15 and 16 are sectional views on lines 15—15 and 16—16 respectively of Fig. 14.

By reference to the mechanism in section C, more particularly, the enlarged view in Fig. 4 it will be seen that the material is acted upon by single headed double acting press. The movable member indicated by the numeral 17 may carry a cutting tool for performing the first operation on blank in this section as illustrated in Figs. 11, 12 and 13. This operation it will be noticed consists in entirely severing the blank from the metal sheet and continuing the elongated slots 41 and 42 toward the sides of the sheet terminating at corners 55 to 57 respectively, where each slot makes a rightangle turn extending in the direction of the opposite slot, forming the connecting slots 59 and 60 and enlarged slots 59<sup>a</sup> and 60<sup>a</sup>, and the diametrically opposed and inwardly extending branches 59<sup>b</sup>, 59<sup>c</sup>, 60<sup>b</sup> and 60<sup>c</sup>. The cutting operation just described, results in severing the blank designated by the numeral 61, Figs. 11 to 16 inclusive, and before the cutting die is withdrawn in order to prevent the release and displacement of the blank 61 from the position in which it is held by reason of the contact of the tool carried by head member 17 which forces the blank against supporting member 18, bending or forming die carried on movable members 19 and 20 moves forward and firmly holds the blank against supporting member 18 thus allowing the cutting die carried on member 17 to be withdrawn. The action of the forming die or tool carried on members 19 and 20 is continued, thus crowding the blank into forming means on member 18 bending outwardly into position the side members indicated by the numerals 62 and 63, Figs. 14 and 16, at the same time the end members indicated by numerals 64 and 65 Figs. 14 and 15 are formed outwardly into position from the plane of the blank. During this operation the shell blank is crowded entirely through member 18 by the forming tool and placed in the position indicated by the shell 61 shown in dotted lines on turret wheel 21, Figs. 4 and 5. The forming tool which has accomplished the result of placing the shell in position on rotating wheel 21 is then withdrawn, movement is imparted to wheel 21 by which it is caused to rotate in the direction of the arrows as indicated in Fig. 1. Before another operation is performed on the shell it is carried by the wheel 90 degrees, thus placing it in position to receive filling material or body from mechanism illustrated by section F, Fig. 1, which mechanism is also shown in enlarged elevation view in Fig. 6.

Figure 17:
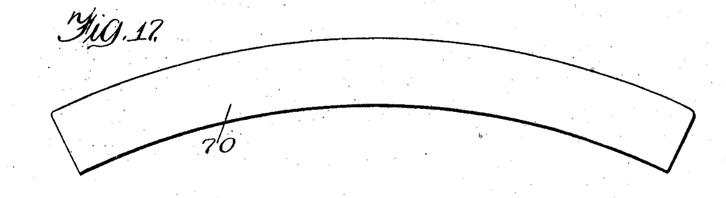
Figs. 17 and 18 are elevations in plan view of one form of the filling material or body substance to be inserted in my shell or holder at the stage of completion the same as illustrated in Figs. 14, 15 and 16.

As a body or filler for the shoe, various vegetable and mineral substances and compositions have been used and with varying success. In order that the completed shoe may have the proper frictional qualities in contacting with the moving surface on the wheels, material of great firmness is required. I prefer to use vegetable fiber, preferably wood, of the common varieties but ordinarily belonging to the classes of the hardwoods. This wood I previously treat by various well-known processes; driving the vegetable juices therefrom and impregnating the fibrous substance with carbon oils. Before being presented to the mechanism in section F blocks of previously treated wood are given the shape indicated by numeral 70, Figs. 17 and 18.

Figure 16:
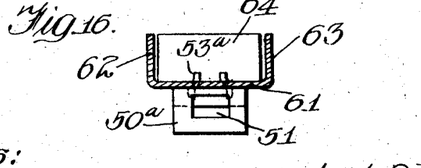
Figure 18:
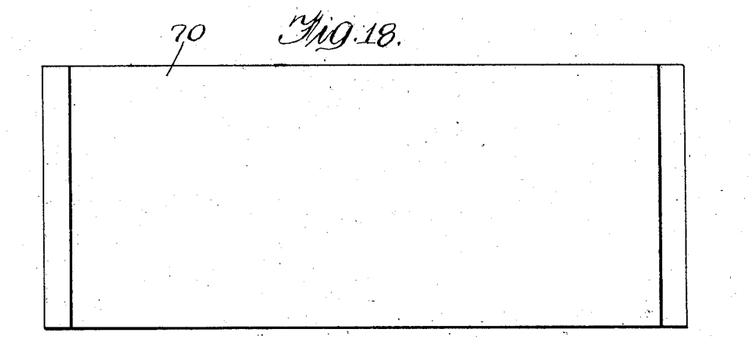
Figure 19:
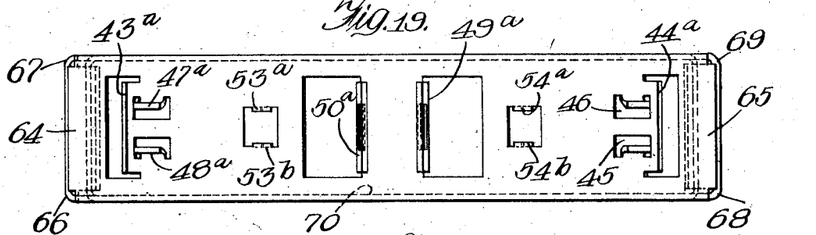
Figs. 19 and 20 are plan and elevation views respectively of a complete brake shoe made by my improved process.

The mechanism in section F will be more fully described and is also claimed in application for Letters Patent of even date herewith. It is designed to compress block 70 laterally to one-half its width and as illustrated in Fig. 18, it is approximately double the width of the interior of the shell as illustrated in Figs. 14, 16 and 19. It will be noted that the shell 61 has not yet been given the necessary curvature to correspond with the curvature of its contacting surface on the car wheel, although by reference to the holder form 22 Figs. 4 and 5, it will be seen that the form itself has the requisite degree of curvature. The members 23 and 24 which hold the shell by grasping the members 49<sup>a</sup> and 50<sup>a</sup> on the back of shell are elastically mounted in order that they may withdraw toward the convex side of the curve of this form when it is desired to give the shell its proper degree of curvature. This I prefer to accomplish at the same time the filling block is inserted by the mechanism in section F. Movable members 25 and 26 in section F are adapted to perform the described operation of compressing the wood which they do by acting in conjunction with the fixed member 27. After the blocks are compressed they are grasped by suitable feeding mechanism, as for example, the reciprocating members 28 and 29. I prefer to make these reciprocating members of sufficient strength to permit of very firm pressure being applied thereby in inserting the filling blocks into the shell. The convex face of the block is first presented to the shell, and after being inserted sufficient pressure is applied to cause the shell to assume the proper degree of curvature to correspond with the filling block, which degree of curvature is also approximately the same as that of the shell holding block or form 22 previously described.

In construction shown it will be noted that I employ a double headed press for compressing the filling material which makes it necessary to employ the double inserting mechanism 28 and 29. These inserting mechanisms work alternately, one presenting a block of wood to the shell, while the other mechanism is holding a block under pressure.

Figure 5:
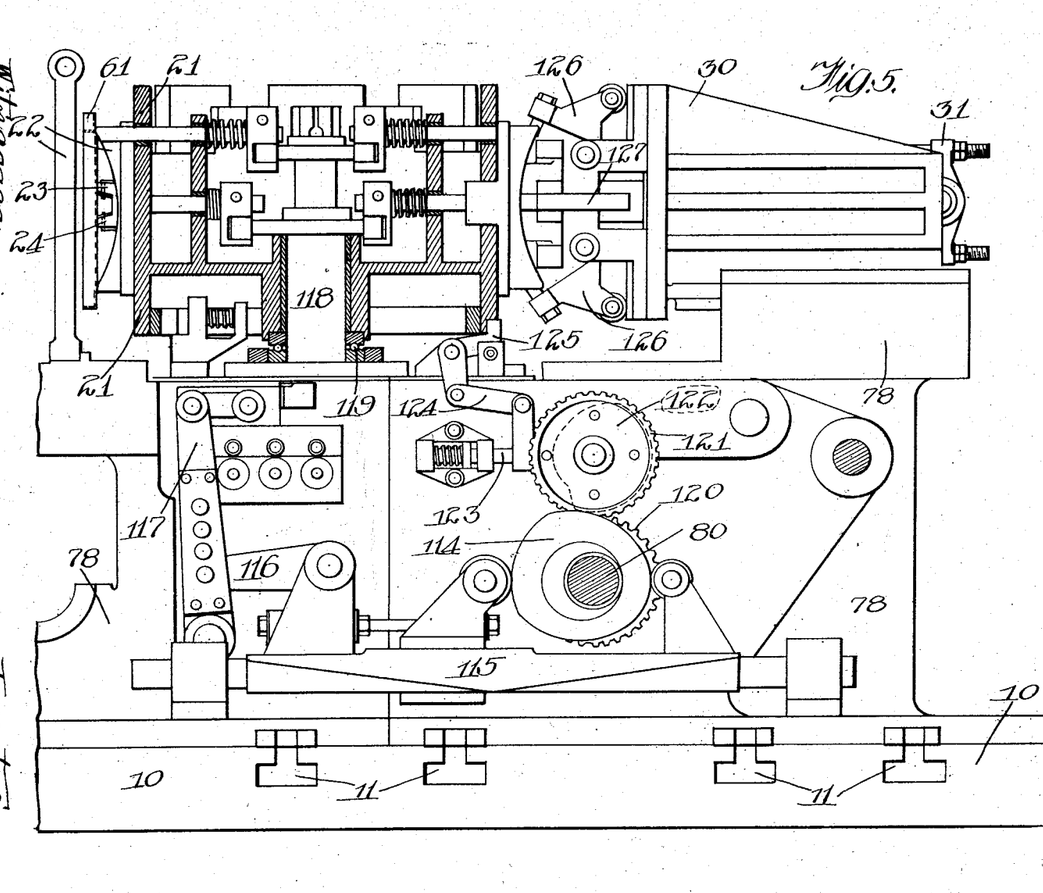

The shell, and filling material inserted therein, in the manner just described, is next presented to the mechanism indicated by section E, Fig. 1 and is also shown in side elevation in Fig. 5 together with a section of turret wheel 21 and its adjacent mechanism previously referred to as section D, Fig. 1.

Figure 20:
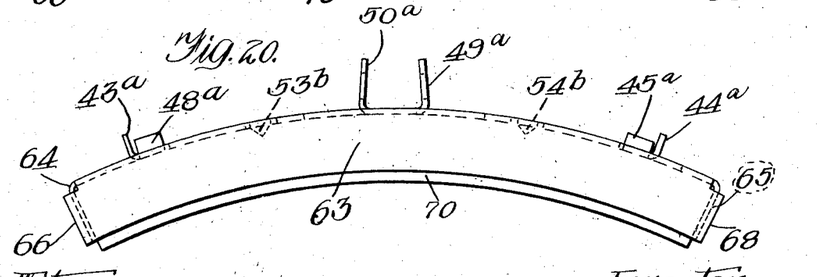

Final operations in making a completed shoe are performed by mechanism in section E in which mechanism for carrying forming tools of similar construction referred to in section C is employed. This consists of what may be termed a single headed double acting press. The reciprocating head or ram 30 actuates suitable mechanism for compressing the side members 62 and 63 in order to cause them to contact closely with the filling material. These side members of the shell, as they leave the mechanism in section C, are not quite at right angles to the back of the shell. The action of the forming mechanism in section C will bring them to the right angle position but the elasticity of the metal causes them to spring apart slightly which is of value in the process in permitting the insertion of the filling material. By referring to Fig. 11 it will be noted that in the operation of severing the shell blank from the sheet material auxiliary end members 66 to 69 inclusive were formed. The position these members assume after the process of folding the sides and ends of the shell, is shown by referring to Figs. 14 and 15. Immediately after the operation just described, of closing the side members 62 and 63, and before the pressure is released, the second section 31 of the reciprocating member or ram actuates suitable bending and compressing mechanism to fold members 66 and 67 inwardly and around end member 64 and members 68 and 69, likewise around end member 65. The position of these parts on the completed shoe is shown by reference to Figs. 19 and 20. This operation completes the shoe and it is then carried by the turret wheel 21 from contact with the mechanism which is described in section E and may be discharged at any convenient point before it is carried by the revolution of the turret to a point in juxtaposition with the mechanism in section C. Any convenient form of receiving and conveying mechanism, as indicated diagrammatically by 32 and 32$^a$, may be employed for this purpose.

Any desired number of inwardly extending barbs similar to 53$^a$, 53$^b$, 54$^a$ and 54$^b$ may be employed. The material is impaled on these barbs at the time of its insertion in the shell by the mechanism in section F. This construction assists in retaining the filling material more firmly in the shell and is a feature which is particularly desirable on account of the adaptability of a brake shoe of my construction to withstand wear until the filling material and sides of the shell have been practically worn away.

75 (see Fig. 1) is any convenient form of holding device or mechanism for retaining a quantity of sheets of material for insertion in the mechanism and between feeding jaws 12.

76 is the main frame upon which mechanism section A is mounted. 77 is a similar frame carrying mechanism in section B.

The frame for carrying mechanism in sections C, D and E may be integral as indicated in 78, or the mechanisms in these sections may be carried on separate frames if desired and secured by attaching them to each other and to bed plate 10.

79 is the frame supporting mechanism in section F and is somewhat similar in construction to 76 and 77.

80 is shaft mounted on frame 78 transmitting power to the entire mechanism through spur gear 81 which is geared into 82 mounted on shaft 83 imparting motion to mechanism in section F.

82 also meshes with spur gear 84 mounted on shaft 85 which shaft passes continuously through sections A and B, as will be seen by referring to Fig. 1.

Cam 86 mounted on shaft 85 imparts reciprocating motion to member 87 and which in turn acting on members 88 and 89 and segmental bell crank 90 gear 91 and any suitable rack and pinion movement imparts reciprocating movement to shaft 92. Shaft 92 may extend to mechanisms in sections A, B and C thereby actuating feeding mechanisms of those sections synchronously.

Figure 3:
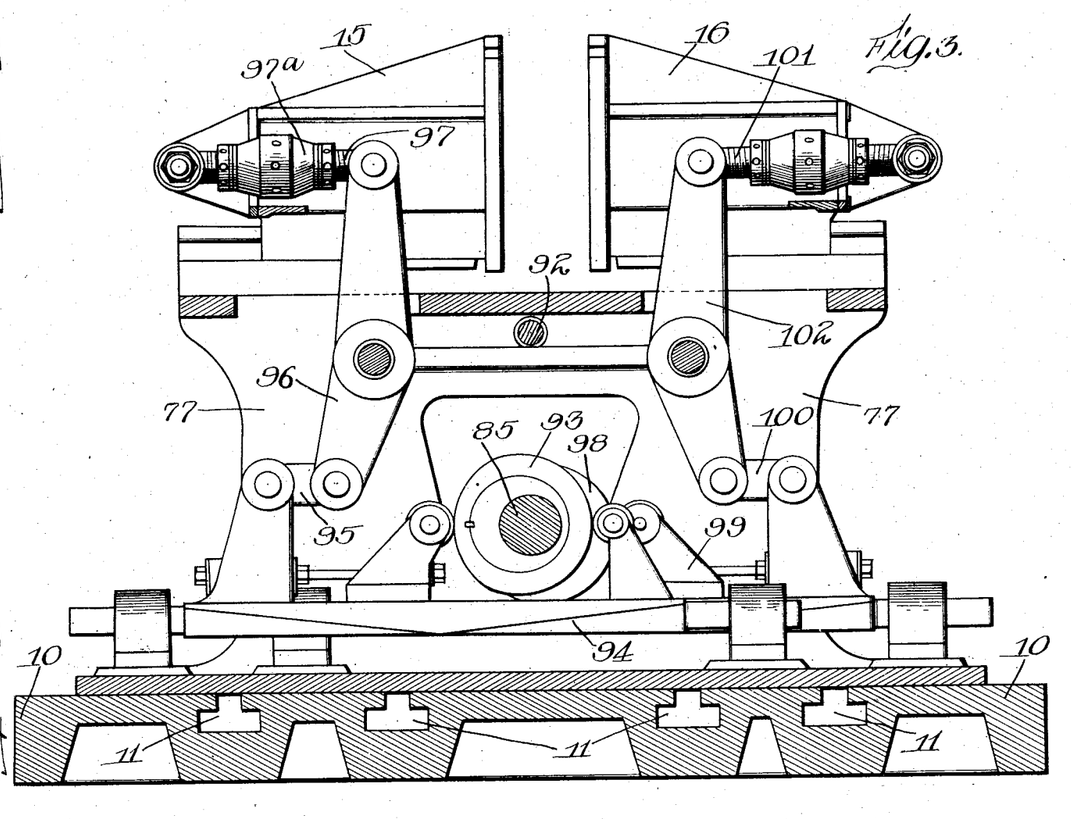
Fig. 3 is a side elevation of mechanism designated by section B and is taken on line 3—3 Fig. 1.

By reference to Fig. 3 the form of mechanism I prefer to employ for reciprocating the two carrying heads or rams in various presses will be seen. 93 is an eccentric cam on shaft 85 imparting reciprocating motion to member 94 which imparts movement to member 15 through links 95 and 97. Link 97 may be adjustable by turn buckle 97$^a$ for the purpose of making slight adjustments. Mechanism for operating member 16 includes eccentric cam 98, reciprocating member 99, links 100 and 101 and lever 102, similar to that just described.

Mechanism employed in Fig. 4 for actuating double acting press is similar to that just described including cams 103 and 104, reciprocating members 105 and 106, links 107, 108, 109 and 110, and levers 112 and 113. Eccentric cam 114 (see Fig. 5) and reciprocating member 115 are adapted to impart motion to turret or carrying wheel 21. This may be accomplished to link 116, reciprocating lever 117 and any convenient form of construction connected thereto as for example, familiar pawl and ratchet mechanism 118 represents the axis on which turret wheel 21 is rotated; ball bearing or other antifriction means as indicated at 119 may be employed. Gear 120 carried by shaft 80 meshes with gear 121 thereby actuating cam 122. This cam acting on spring controlled reciprocating member 123 and connecting link 124 controls stop 125 which is provided for the purpose of checking turret wheel 21 at predetermined intervals thus presenting the holding and forming members 22 mounted thereon to the mechanisms in sections C, F and E in the proper relation, in order that the heretofore described operations may be performed on the materials carried by the wheel. Bell cranks 126 are acted upon by member 31 in manner previously described and carry the tools for folding the auxiliary end members of the shell, and members 127 carry the tools for finally compressing the sides of the shell, both of which operations have been previously described.

Figure 6:
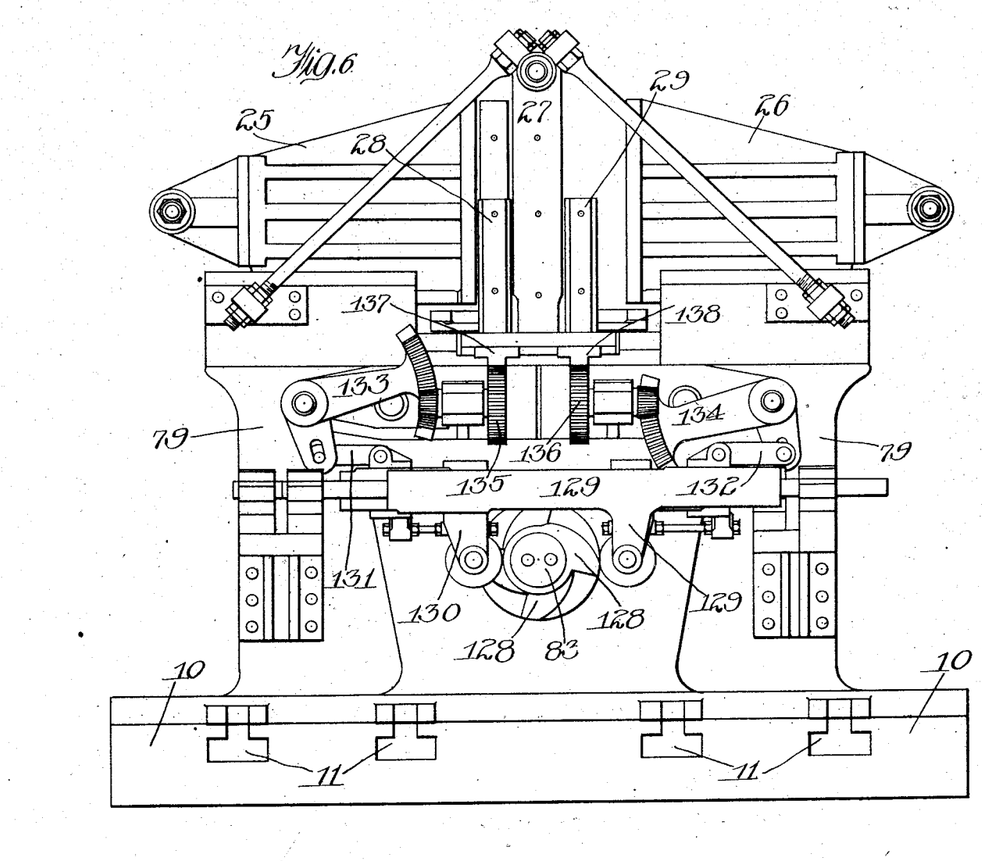
Fig. 6 is an elevation of mechanism designated by section F Fig. 1 and is taken on line 6—6.
Figure 7:
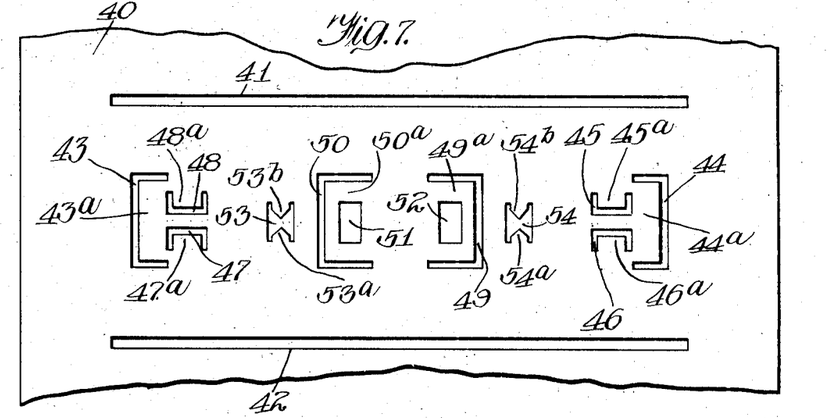
Fig. 7 is an illustration of the material used in forming the shell or holder for my brake shoe after the same has passed through stamping or punching press indicated by mechanism in section A, Figs. 1 and 2.
Figure 8:
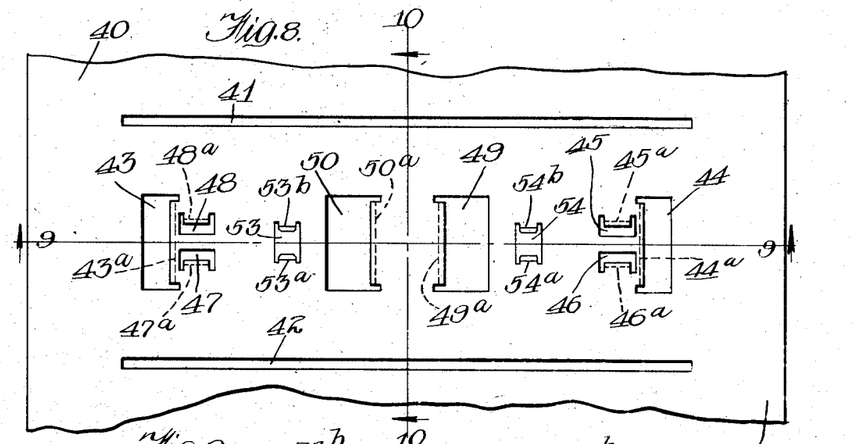
Fig. 8 illustrates the same material after passing through forming or bending dies carried by the mechanism in section B, Fig. 3.
Figures 9, 10:
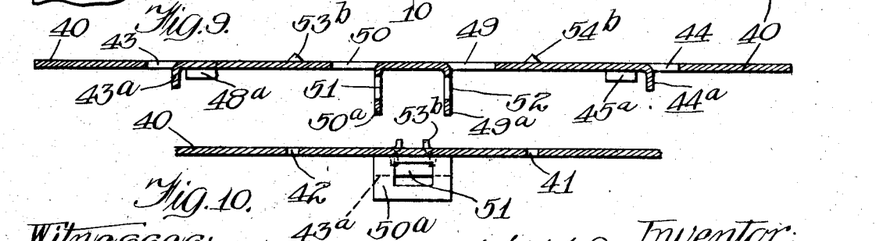
Fig. 9 is a sectional view on line 9—9, Fig. 8.
Fig. 10 is a sectional view on line 10—10, Fig. 8.

The eccentric cams 128 (see Fig. 6) pass reciprocating motion to members 129 and 130 which in turn actuate members 28 and 29 through links 131 and 132, segmental gears 133 and 134, toothed pinions 135 and 136 and racks 137 and 138, movements similar to that previously described for actuating the feeding mechanism section A. Rams or heads 25 and 26 are actuated from shaft 83 by mechanism similar to that previously shown and described, (see Fig. 3).

In order that the invention might be fully understood, the details of an embodiment thereof have been thus specifically described, but

What I claim is:—

1. The herein described art or method of making brake shoes having a filling or body of frictional material incased in a shell or holder formed of sheet metal, which consists in providing a shell blank with integral back, side, and end members, folding said side and end members at an angle to the plane of said back member, inserting within the shell or holder thus formed while held within the matrix a filling block of frictional material, under sufficient pressure to give said shell the curvature necessary to correspond with the braking surface of a car wheel, and closing the side and end members by folding them inwardly on said filling.

2. The herein described art or method of making a brakeshoe, which consists in inserting a body of filling material of high frictional qualities, formed with two of its opposite faces curved concentrically to correspond to the braking surface of a car wheel, in a holder or shell of sheet metal embodying a back member, side members and end members folded at an angle thereto, and auxiliary end members integral with said side members, and causing the shell or holder to conform to the surface of the filling material by using the same as a die block or former to impart its curvature to the back of the shell and afterward securing the side members, end members and auxiliary end members, by folding and compressing them inwardly to contact with sides and ends of the filling material.

3. The herein described art or method of making brake shoes having a filling or body of frictional material incased in a shell or holder of ductile material, which consists in providing a body or block of filling material of the form desired in a completed shoe having a curvilinear frictional surface and a back surface approximately concentric with the said curvilinear frictional surface, and afterward using said filling material as a die block or former to produce a corresponding curvilinear shape to the back member of the shell or holder by inserting the filling into the shell under pressure while the shell is held in a matrix or form.

In testimony whereof I have signed my name to this specification, in the presence of two subscribing witnesses, on this 11th day of December A. D. 1906.

FREDERICK K. CASWELL.

Witnesses:
M. W. CANTWELL,
A. L. SPRINKLE.